(12) United States Patent
Chen et al.

(10) Patent No.: US 11,275,591 B2
(45) Date of Patent: Mar. 15, 2022

(54) DATA STORAGE DEVICE AND METHOD FOR MAINTAINING NORMAL BOOT OPERATION OF DATA STORAGE DEVICE

(71) Applicant: INNODISK CORPORATION, New Taipei (TW)

(72) Inventors: Ming-Sheng Chen, New Taipei (TW); Chih-Ching Wu, New Taipei (TW)

(73) Assignee: Innodisk Corporation, New Taipei (TW)

( * ) Notice: Subject to any disclaimer, the term of this patent is extended or adjusted under 35 U.S.C. 154(b) by 0 days.

(21) Appl. No.: 17/088,892

(22) Filed: Nov. 4, 2020

(65) Prior Publication Data

US 2021/0303314 A1 Sep. 30, 2021

(30) Foreign Application Priority Data

Mar. 27, 2020 (TW) ................. 109110728

(51) Int. Cl.
*G06F 9/4401* (2018.01)
*G06F 3/06* (2006.01)

(52) U.S. Cl.
CPC ............ *G06F 9/4406* (2013.01); *G06F 3/061* (2013.01); *G06F 3/0659* (2013.01); *G06F 3/0679* (2013.01)

(58) Field of Classification Search
CPC ...... G06F 9/4406; G06F 3/061; G06F 3/0659; G06F 3/0679
See application file for complete search history.

(56) References Cited

U.S. PATENT DOCUMENTS

| | | | |
|---|---|---|---|
| 6,185,678 B1 * | 2/2001 | Arbaugh ............... | G06F 21/575 713/2 |
| 10,740,468 B2 * | 8/2020 | Shivanna ............. | G06F 21/572 |
| 2008/0155331 A1 * | 6/2008 | Rothman ............ | G06F 11/1417 714/36 |
| 2020/0310821 A1 * | 10/2020 | Michishita .......... | G06F 11/1417 |

* cited by examiner

*Primary Examiner* — Tammara R Peyton
(74) *Attorney, Agent, or Firm* — Rosenberg, Klein & Lee (57) ABSTRACT

The invention provides a data storage device comprising a controller and a data storage unit. The data storage unit comprises a first system storage area and a second system storage area. The first system storage area stores an original operating system, and comprises a first initial sector address. The second system storage area stores a backup operating system, and comprises a second initial sector address. The controller comprises a firmware. A boot pointer offset procedure is defined in the firmware. A boot pointer is preset by the firmware to point to the first initial sector address of the first system storage area, and therefore a boot operation is executed by the original operating system. When the original operating system damages, the firmware executes the boot pointer offset procedure to offset the boot pointer to the second initial sector address, and executes the boot operation by the backup operating system.

6 Claims, 6 Drawing Sheets

DATA STORAGE DEVICE AND METHOD FOR MAINTAINING NORMAL BOOT OPERATION OF DATA STORAGE DEVICE

This non-provisional application claims priority claim under 35 U.S.C. § 119(a) on Taiwan Patent Application No. 109110728 filed Mar. 27, 2020, the entire contents of which are incorporated herein by reference.

FIELD OF THE INVENTION

The present invention relates to a method for maintaining normal boot operation of data storage device.

BACKGROUND

When a computer is used, an operating system is often damaged due to improper operation, getting a virus or power failure. In the past, the computer manufacturer would attach a recovery optical disk containing a recovery file of the operating system, for example, an image file of the operating system. When the operating system has damaged, the user can execute an operating system recovery procedure via the recovery file in the recovery optical disk to recover the operating system. However, the recovery optical disk is easy lost or scratched, and therefore the operating system recovery procedure is often unable to proceed, smoothly.

Alternatively, the previous operating system recovery procedure can be also performed via a miniaturized system. A data storage area of a data storage device inside the computer is divided into an operating system area and a system recovery area. The operating system area stores an operating system, and the system recovery storage area stores a system image file and a miniaturized system (such as Windows PE). When the user wants to execute the operating system recovery procedure, he can press a recovery button connected to a motherboard to trigger an operating system recovery function. After the operating system recovery function is triggered, BIOS of the computer performs to boot via the system recovery area. When the computer has booted, the user can decompress the system image file by the operation the miniaturized system, and recover the operating system via the system image file decompressed.

By the miniaturized system executing the operating system recovery procedure, the file format of the system image file and the version of the operating system must be able to be parsed by the miniaturized system or else the system image file cannot be decompressed such that the operating system cannot be recovered. Therefore, the operating system recovery procedure executed by the miniaturized system is usually suitable for using on a computer with an operating system of Microsoft Windows.

At present, most of the operating systems in industrial control equipments are adopting non-windows operating systems, such as Linux and TinyOS. If the operating system recovery procedure of the industrial control equipment is executed by the miniaturized system, the software structure of the miniaturized system must be redesigned according to the version of the operating system adopted by the industrial control equipment, else the operating system recovery procedure of the industrial control equipment will not be completed smoothly. Accordingly, the redesigning of the miniaturized system will cause many troubles for software designers of industrial control equipment.

SUMMARY

It is one objective of the present invention to provide a data storage device, which can be disposed in an electronic apparatus, and comprises a controller and a data storage unit. A boot pointer offset procedure is defined in the firmware. The data storage unit comprises a first system storage area storing an original operating system and a second system storage area storing a first backup operating system. The firmware of the controller presets a boot pointer to point to a first initial sector address of the first system storage area, and sets the first initial sector address as a master boot sector address. When the original operating system is normal, the firmware of the controller reads a master boot record from the first initial sector address, and executes a boot operation of the original operating system by the master boot record read from the first initial sector address. When the original operating system damages, the firmware of the controller will execute a boot pointer offset procedure to offset the boot pointer from the first initial sector address of the first system storage area to the second initial sector address of the second system storage area, read a master boot record from the second initial sector address, and execute the boot operation of the first backup operating system by the master boot record read from the second initial sector address. Accordingly, when the original operating system damages, the boot of the electronic apparatus can be restored quickly by the first backup operating system, and thus the electronic apparatus may maintain operations in operating environment of the first backup operating system.

It is another objective of the present invention to provide a data storage device, in which an operating system recovery procedure is defined in the firmware of the controller of the data storage device. When the original operating system in the first system storage area has damaged, the firmware of the controller executes the operating system recovery procedure. During the operating system recovery procedure, by a means of copying the sector data, the firmware of the controller copies the data of the first backup operating system stored in the data sector of the second system storage area to the data sector of the first system storage area so as to recover the original operating system in the first system storage area. The original operating system can be recovered by the means of copying the sector data, such that a version of the original operating system does not need to be parsed and recognized in the recovery process of the original operating system, and the electronic apparatus adopting Microsoft Windows operating system or non-Microsoft Windows operating system can both be performed the recovery of the operating system easily.

To achieve the above objective, the present invention provides a data storage device, comprising: a data storage unit, comprising: a first system storage area, storing an original operating system, and comprising a first initial sector address; and a second system storage area, storing a first backup operating system, and comprising a second initial sector address; and a controller, connected to the data storage unit, and comprising a firmware, wherein a boot pointer offset procedure is defined in the firmware, a boot pointer is preset by the firmware to point to the first initial sector address of the first system storage area, and a boot operation is executed by the original operating system; when the original operating system damages, the firmware of the controller executes the boot pointer offset procedure to offset the boot pointer to the second initial sector address of the second system storage area, and executes the boot operation by the first backup operating system of the second system storage area.

In one embodiment of the present invention, the data storage device further comprises a data transmission interface connected to the controller; when the controller receives an external triggering command via the data transmission interface, the firmware of the controller executes the boot pointer offset procedure according to the external triggering command.

In one embodiment of the present invention, the controller is connected to an input and output port, the firmware of the controller executes the boot pointer offset procedure when the input and output port is triggered.

In one embodiment of the present invention, a data sector of the first initial sector address and a data sector of the second initial sector address have a master boot record, respectively.

In one embodiment of the present invention, the data storage unit further comprises a third system storage area storing a second backup operating system, and an operating system recovery procedure is defined in the firmware; when the first backup operating system finishes the boot process and operates normally, the firmware of the controller executes the operating system recovery procedure to recover the original operating system of the first system storage area by the second backup operating system of the third system storage area.

The present invention further provides a data storage device, comprising: a data storage unit, comprising: a first system storage area storing an original operating system; and a second system storage area storing a backup operating system; and a controller, connected to the data storage unit, and comprising a firmware, wherein an operating system recovery procedure is defined in the firmware; when the original operating system damages, the firmware of the controller executes the operating system recovery procedure to recover the original operating system of the first system storage area by the backup operating system of the second system storage area, and then execute a boot operation by the recovered original operating system.

In one embodiment of the present invention, the data storage device further comprises a data transmission interface connected to the controller; when the controller receives an external triggering command via the data transmission interface, the firmware of the controller executes the operating system recovery procedure according to the external triggering command.

In one embodiment of the present invention, the controller is connected to an input and output port, the firmware of the controller executes the operating system recovery procedure when the input and output port is triggered.

The present invention further provides a method for maintaining a normal boot operation of a data storage device, wherein the data storage device comprises a data storage unit and a controller, the data storage unit comprises a first system storage area and a second system storage area, the first system storage area stores an original operating system and comprises a first initial sector address, the second system storage area stores a first backup operating system and comprises a second initial sector address, the controller comprises a firmware, a boot pointer offset procedure is defined in the firmware, the method executed by the firmware of the controller comprising steps of: presetting a boot pointer to point to the first initial sector address of the first system storage area; executing the boot pointer offset procedure to offset the boot pointer to the second initial sector address of the second system storage area when the original operating system damages; reading a master boot record from the second initial sector address of the second system storage area; and executing a boot operation of the first backup operating system according to the master boot record read from the second initial sector address of the second system storage area.

In one embodiment of the present invention, further comprising steps of: controlling the firmware of the controller to execute the boot pointer offset procedure by a means of software triggering or a hardware triggering.

The present invention further provides a method for maintaining a normal boot operation of a data storage device, wherein the data storage device comprises a data storage unit and a controller, the data storage unit comprises a first system storage area and a second system storage area, the first system storage area stores an original operating system, the second system storage area stores a backup operating system, the controller comprises a firmware, an operating system recovery procedure is defined in the firmware, the method executed by the firmware of the controller comprising steps of: executing the operating system recovery procedure to recover the original operating system of the first system storage area by the backup operating system of the second system storage area; and execute a boot operation by the recovered original operating system.

DETAILED DESCRIPTION OF THE PREFERRED EMBODIMENTS

Figure 1:
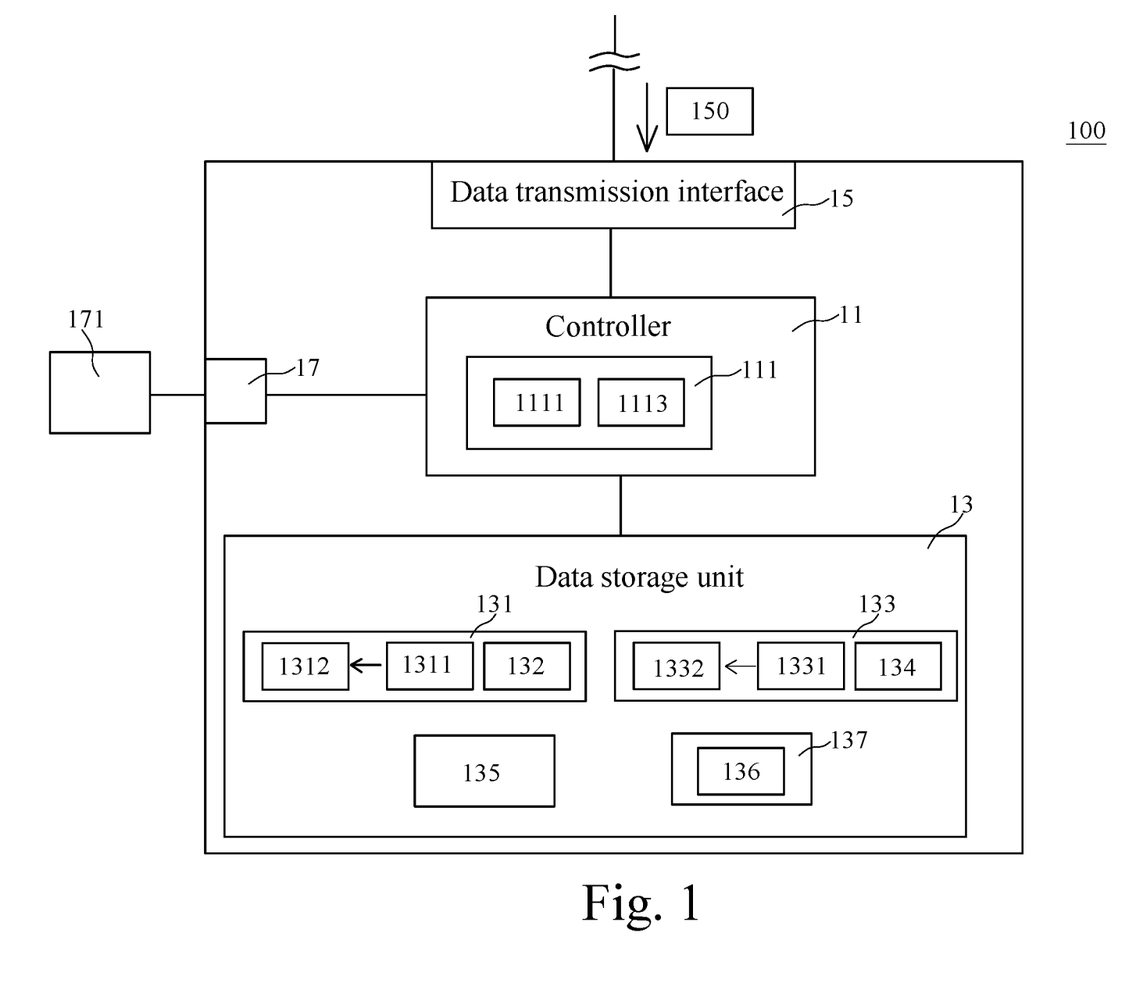
FIG. 1 is a structural view of a data storage device of the present invention.
Figure 2:
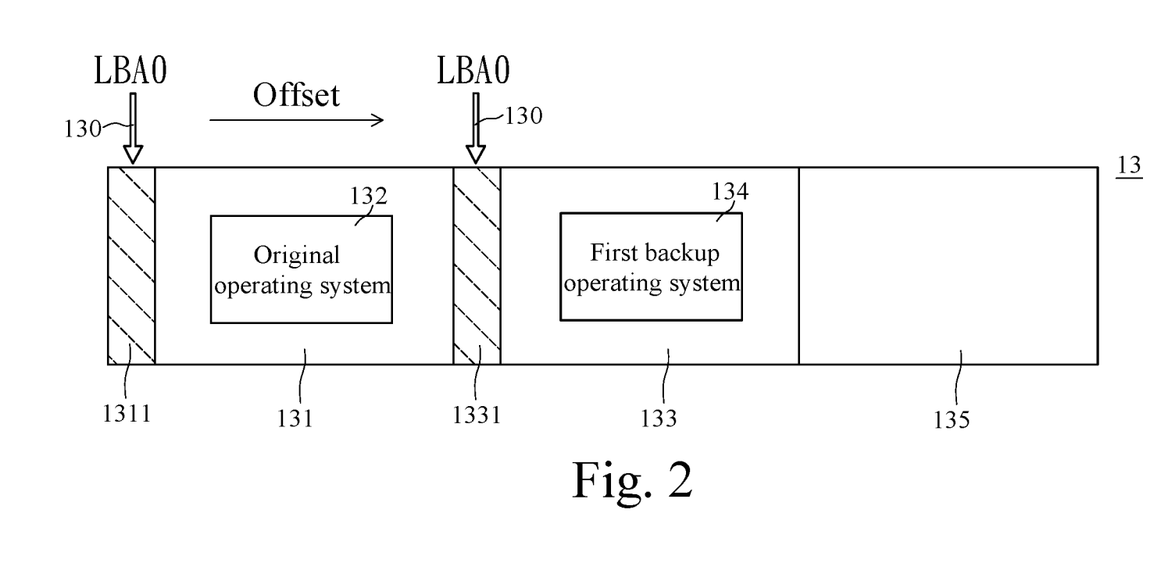
FIG. 2 is a schematic diagram of a data sector of a data storage unit of the data storage device according to one embodiment of the present invention.

Referring to FIG. 1 and FIG. 2, there are shown a structural view of a data storage device of the present invention, and a schematic diagram of a data sector of a data storage unit of the data storage device according to one embodiment of the present invention. As shown in FIG. 1 and FIG. 2, the data storage device 100 of the present invention may be a SSD (Solid State Disk), which is disposed in an electronic apparatus (such as a computer or an automation apparatus), and as a storage medium of the electronic apparatus. The data storage device 100 comprises a controller 11, a data storage unit 13, a data transmission interface 15, and an input and output port 17. The controller 11 is connected to the data storage unit 13, the data transmission interface 15, and the input and output port 17, respectively.

The controller 11 comprises a firmware 111. A boot pointer offset procedure 1111 is defined in the firmware 111. The data storage unit 13 comprises a plurality of flash memories, which are formed with a plurality of data sectors. As shown in FIG. 2, the data sectors of the data storage unit 13 are divided by the firmware 111 of the controller 11 into a first system storage area 131, a second system storage area 133, and a data storage area 135. The first system storage area 131 stores an original operating system 132, and comprises a first initial sector address 1311. The second system storage area 133 stores a first backup operating system 134, and comprises a second initial sector address 1331. The data sector of the first initial sector address 1311 has a master boot record (MBR) 1312, and the data sector of the second initial sector address 1331 has another MBR 1332. In one embodiment of the present invention, a boot pointer 130 is preset by the firmware 111 of the controller 11 to point to the first initial sector address 1311 of the first system storage area 131, and the first initial sector address 1311 is set as a master boot sector address, for example, the logical block addressing 0 (LBA 0).

When the electronic apparatus is power on, firstly, according to the indication of the boot pointer 130, the firmware 111 of the controller 11 enters the first system storage area 131 of the data storage unit 13, reads the master boot record 1312 from the first initial sector address 1311 of the first system storage area 131, and executes a boot operation of the original operating system 132 by the master boot record 1312. After the original operating system 132 has booted normally, the electronic apparatus will perform operations in the operating environment of the original operating system 132.

If the original operating system 132 damages and therefore cannot boot smoothly, the firmware 111 of the controller 11 will execute the boot pointer offset procedure 1111 to offset the boot pointer 130 from the first initial sector address 1311 of the first system storage area 131 to the second initial sector address 1331 of the second system storage area 133, and change the master boot sector address from the first initial sector address 1311 to the second initial sector address 1331. Sequentially, the firmware 111 of the controller 11 reads the master boot record 1332 from the second initial sector address 1331 of the second system storage area 133, and executes the boot operation of the first backup operating system 134 by the master boot record 1332. After the first backup operating system 134 has booted normally, the electronic apparatus will perform operates in the operating environment of the first backup operating system 134.

Accordingly, when the original operating system 132 damages, the firmware 111 of the controller 11 converts the execution of the boot operation from the original operating system 132 to the first backup operating system 134 by the offsetting of the boot pointer 130, such that the boot operation of the electronic apparatus can be restored quickly, and further the electronic apparatus may continue to execute operations by the use of the first backup operating system 134.

Figure 3:
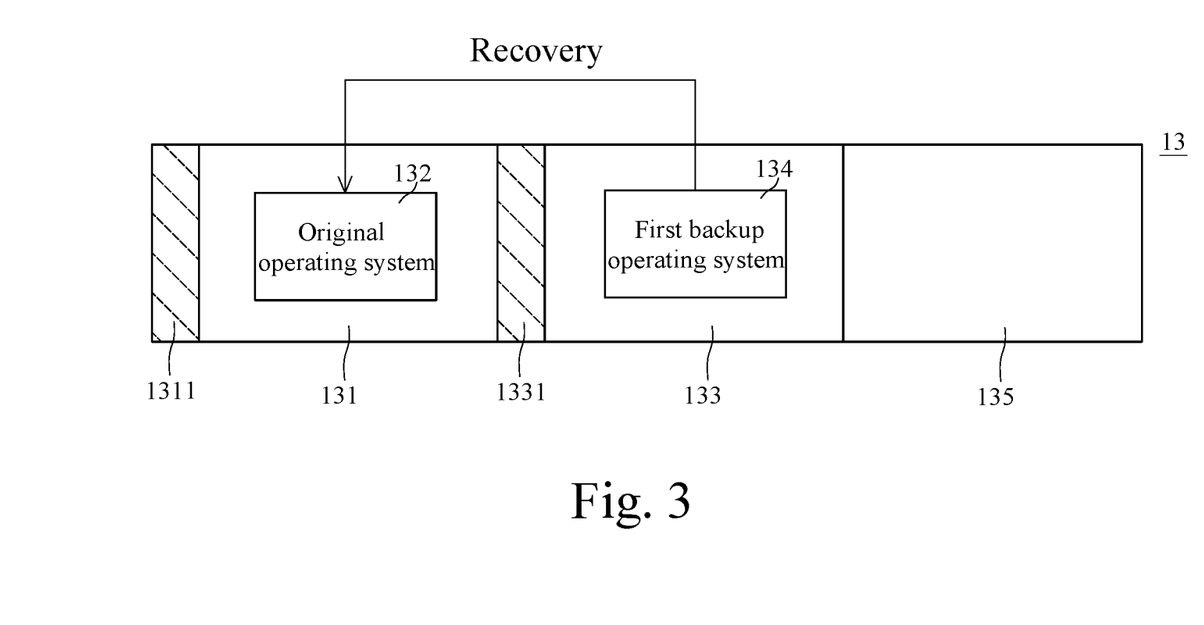
FIG. 3 is a schematic diagram of the data sector of the data storage unit of the data storage device according to another embodiment of the present invention.

Referring to FIG. 3, there is a schematic diagram of the data sector of the data storage unit of the data storage device according to another embodiment of the present invention, with further reference to FIG. 1. As shown in FIG. 1 and FIG. 3, in the present embodiment, an operating system recovery procedure 1113 is further defined in the firmware 111 of the controller 11. When the original operating system 132 damages and cannot boot smoothly, the firmware 111 of the controller 11 executes the operating system recovery procedure 1113 to recover the original operating system 132 of the first system storage area 131 by the use of the first backup operating system 134 of the second system storage area 133. When the electronic apparatus is restarted, the firmware 111 of the controller 11 executes the boot operation by the recovered original operating system 132 again, and then executes the operations of the electronic apparatus by the recovered original operating system 132.

The firmware 11 of the controller 11 of the present invention performs the recovery procedure of the original operating system 132 by a means of copying the sector data. for example, the firmware 11 of the controller 11 copies the data of the first backup operating system 134 stored in the data sector of the second system storage area 133 to the data sector of the first system storage area 131 to recover the original operating system 132. Accordingly, in the present invention, a version of the original operating system 132 does not need to be parsed and recognized in the recovery process of the original operating system 132, such that the electronic apparatus adopting Microsoft Windows operating system or non-Microsoft Windows operating system (such as Linux or TinyOS) can both be performed the recovery of the operating system easily.

Figure 4:
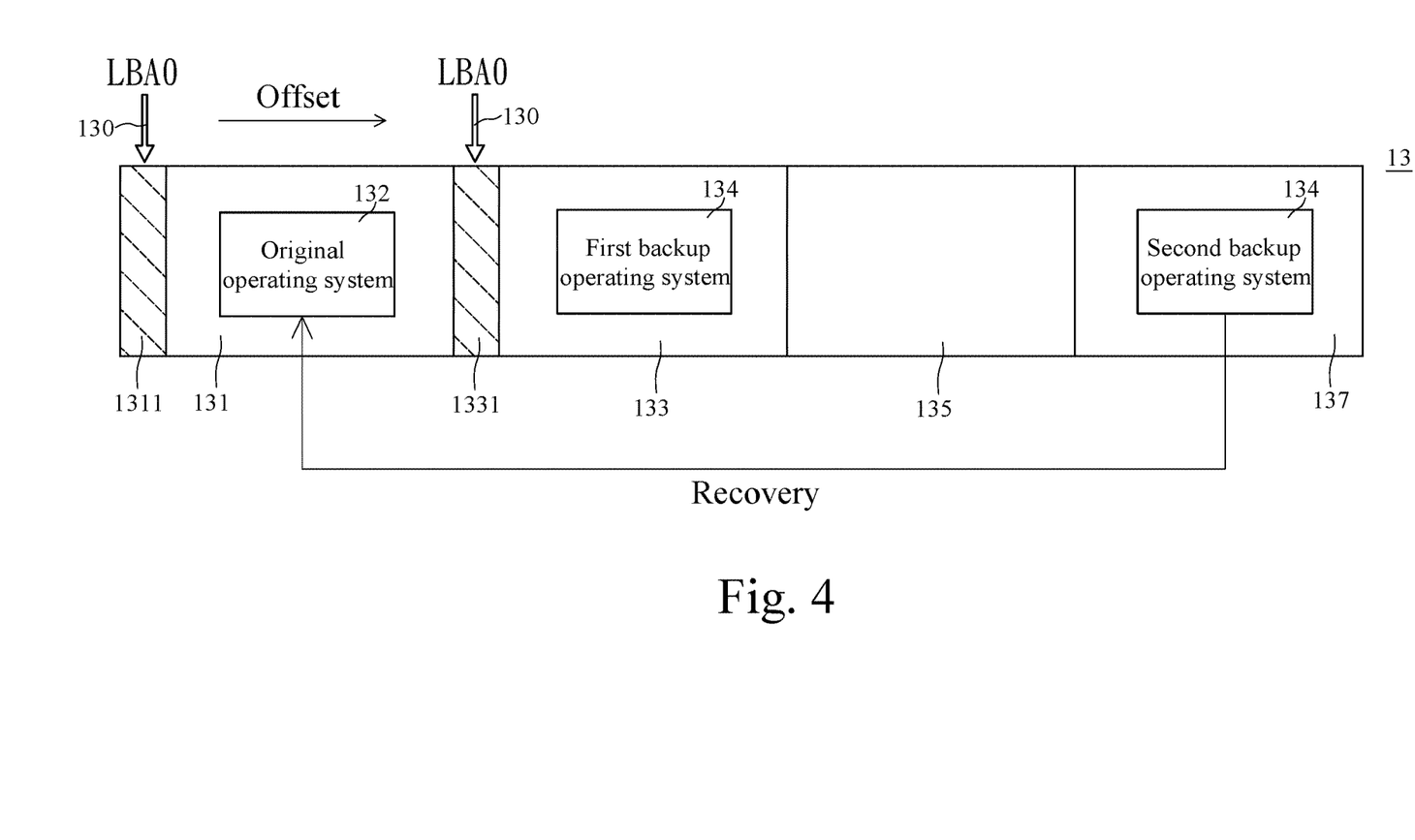
FIG. 4 is a schematic diagram of the data sector of the data storage unit of the data storage device according to another embodiment of the present invention.

Referring to FIG. 4, there is a schematic diagram of the data sector of the data storage unit of the data storage device according to another embodiment of the present invention, with further reference to FIG. 1. As shown in FIG. 1 and FIG. 4, a third system storage area 137 is further divided from the data sectors of the data storage unit 13 by the firmware 111 of the controller 11. The third system storage area 137 stores a second backup operating system 136. In the present embodiment, the third system storage area 137 is a read-only area where writing is prohibited. The boot pointer offset procedure 1111 and the operating system recovery procedure 1113 are defined in the firmware 111 of the controller 11.

When the original operating system 132 is normal, the firmware 111 of the controller 11 enters the first system storage area 131 of the data storage unit 13 according to the indication of the boot pointer 130, reads the master boot record 1312 from the first initial sector address 1311 of the first system storage area 131, and executes the boot operation of the original operating system 132 by the master boot record 1312.

On the contrary, when the original operating system 132 damages and cannot boot smoothly, the firmware 111 of the controller 11 will execute the boot pointer offset procedure 1111 to offset the boot pointer 130 from the first initial sector address 1311 of the first system storage area 131 to the second initial sector address 1331 of the second system storage area 133, set the second initial sector address 1331 as the master boot sector address (LBA 0), read the master boot record 1332 from the second initial sector address 1331 of the second system storage area 133, and executes the boot operation of the first backup operating system 134 by the master boot record 1332. When the first backup operating system 134 has booted and is operating, the firmware 111 of the controller 11 further executes the operating system recovery procedure 1113 to recover the original operating system 132 of the first system storage area 131 by the use of the second backup operating system 136 of the third system storage area 137. Accordingly, when the electronic apparatus starts the next time, the firmware 111 of the controller 11 executes the boot operation by the recovered original operating system 132, and then executes the operations of the electronic apparatus by the recovered original operating system 132.

Again, referring to FIG. 1, in one embodiment of the present invention, the firmware 111 of the controller 11 can execute the boot pointer offset procedure 1111 or the operating system recovery procedure 1113 by a means of software triggering. The data storage device 100 of the present invention can be disposed inside the electronic apparatus, and electrically connected to a motherboard of the electronic apparatus. When an input and output system (BIOS) on the motherboard detects that the original operating system 132 of the data storage device 100 has damaged, it will issue a triggering command 150. After the firmware 111 of the controller 11 receives the triggering command 150 via the data transmission interface 15, it will execute the boot pointer offset procedure 1111 or the operating system recovery procedure 1113 according to the triggering command 150, such that the data storage device 100 can resume the normal boot operation, again.

In another embodiment of the present invention, the firmware 111 of the controller 11 can execute the boot pointer offset procedure 1111 or the operating system recovery procedure 1113 by a means of hardware triggering. The input and output port 17 is connected to a triggering key 171. When the user of the data storage device 100 knows that the original operating system 132 of the data storage device 100 has damaged, he can press the triggering key 171 to trigger the input and output port 17. Afterwards, the firmware 111 of the controller 11 executes the boot pointer offset procedure 1111 or the operating system recovery procedure 1113 according to the input and output port 17 triggered, such that the data storage device 100 can resume the normal boot operation again.

Figure 5:
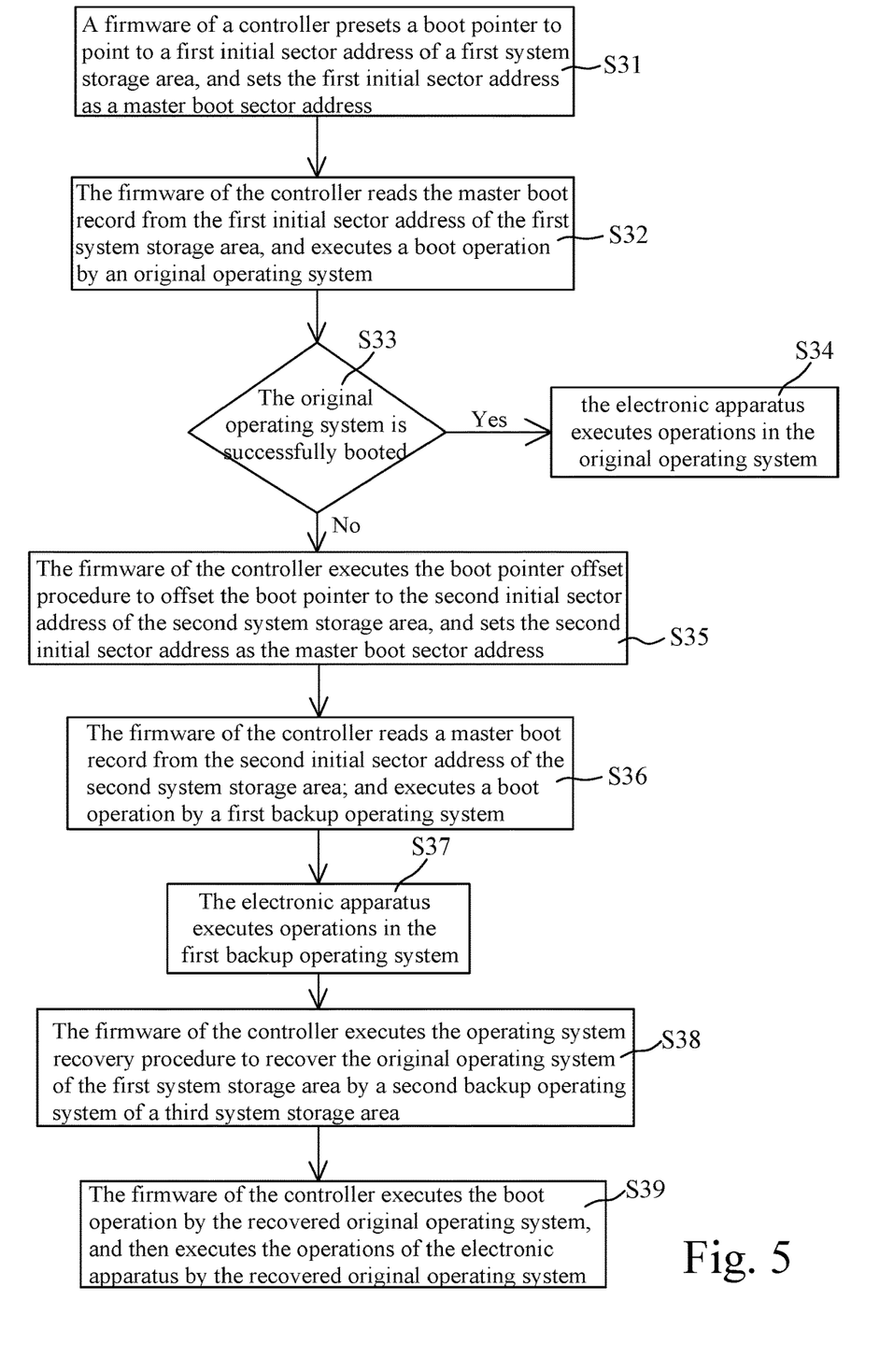
FIG. 5 is a flow chart of a method for maintaining a normal boot operation of the data storage device according to one embodiment of the present.

Referring to FIG. 5, there is a flow chart of a method for maintaining a normal boot operation of the data storage device according to one embodiment of the present, with simultaneous reference to FIG. 1. In the present embodiment, the data storage unit 13 of the data storage device 100 is divided into a first system storage area 131, a second system storage area 133, and a data storage area 135. The first system storage area 131 stores an original operating system 132, and the second system storage area 133 stores a first backup operating system 134. A first initial sector address 1311 of the first system storage area 131 has a master boot record 1312, and a second initial sector address 1331 of the second system storage area 133 has another master boot record 1332.

As shown in FIG. 5, in step S31, firstly, the firmware 111 of the controller 11 presets a boot pointer 130 to point to the first initial sector address 1311 of the first system storage area 131, and sets the first initial sector address 1311 as a master boot sector address. In step S32, when the electronic apparatus starts, the firmware 111 of the controller 11 reads the master boot record 1312 from the first initial sector address 1311 of the first system storage area 131, and executes the boot operation according to the original operating system 132 in the first system storage area 131.

In step S33, if the original operating system 132 is successfully booted, continuing to perform step S34, the electronic apparatus executes operations in the operating environment the original operating system 132; on the contrary, if the original operating system 132 fails to boot, performing step S35, the firmware 111 of the controller 11 executes the boot pointer offset procedure 1111 to offset the boot pointer 130 from the first initial sector address 1311 of the first system storage area 131 to the second initial sector address 1331 of the second system storage area 133, and sets the second initial sector address 1331 as the master boot sector address. In step S36, then, the firmware 111 of the controller 11 reads the master boot record 1332 from the second initial sector address 1331 of the second system storage area 133, and executes the boot operation by the first backup operating system 134 of the second system storage area 133. In step S37, after the electronic apparatus has booted through the first backup operating system 134, it will perform operations in the operating environment of the first backup operating system 134.

In another embodiment of the present invention, a third system storage area 137 is divided from the data storage unit 13 of the data storage device 100. The third system storage area 137 stores a second backup operating system 136. In step S38, during the operation of the first backup operating system 134, the firmware 111 of the controller 11 executes the operating system recovery procedure 1113 to recover the original operating system 132 of the first system storage area 131 by the second backup operating system 136 of the third system storage area 137. In step S39, finally, when the electronic apparatus starts the next time, the firmware 111 of the controller 11 executes the boot operation by the recovered original operating system 132, and then executes the operations of the electronic apparatus by the recovered original operating system 132.

Figure 6:
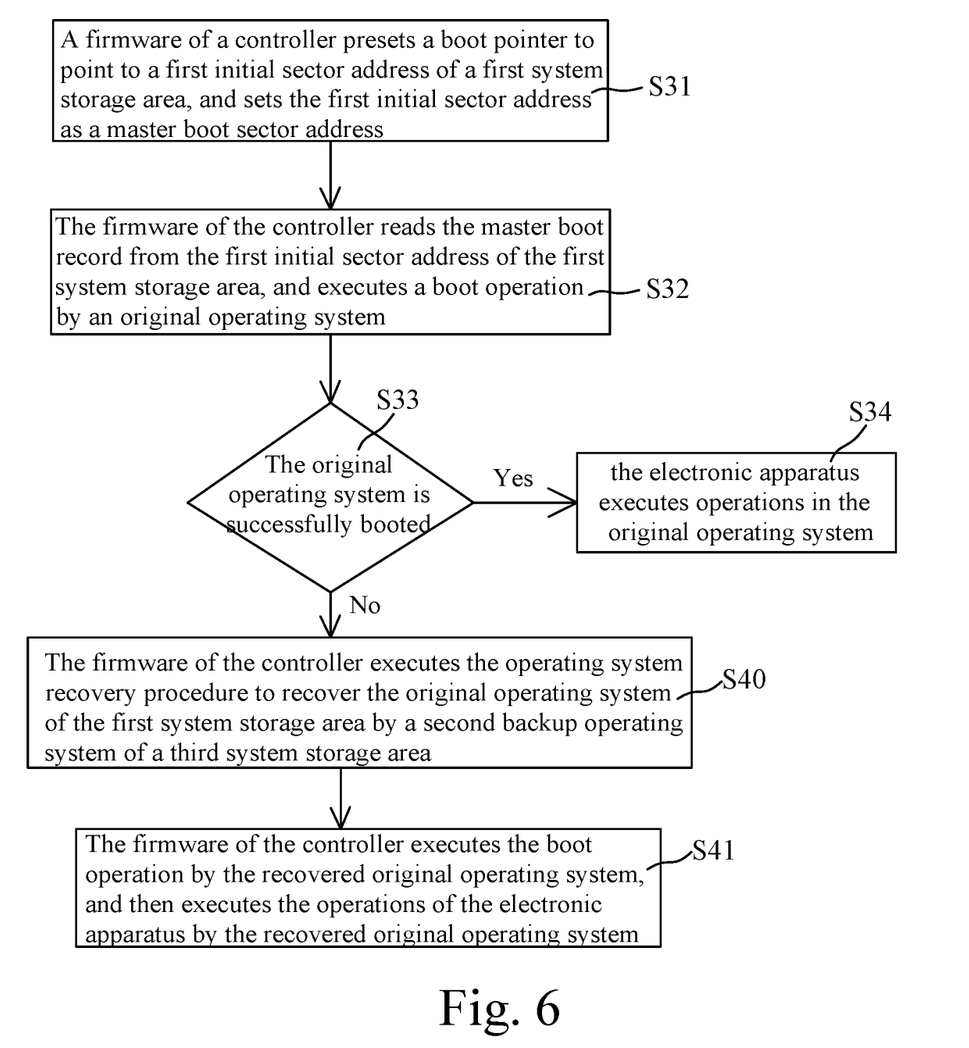
FIG. 6 is a flow chart of a method for maintaining the normal boot operation of the data storage device according to another embodiment of the present.

Referring to FIG. 6, there is a flow chart of a method for maintaining the normal boot operation of the data storage device according to another embodiment of the present, with simultaneous reference to FIG. 1. Firstly, steps S31 to S34 in the embodiment of FIG. 6 are the same as steps S31 to S34 in the embodiment of FIG. 5.

In step S34, if the original operating system 132 fails to boot, performing step S40, the firmware 111 of the controller 11 executes the operating system recovery procedure 1113 to recover the original operating system 132 of the first system storage area 131 by the second backup operating system 136 of the third system storage area 137. In step S41, finally, when the electronic apparatus starts the next time, the firmware 111 of the controller 11 executes the boot operation by the recovered original operating system 132, and then executes the operations of the electronic apparatus by the recovered original operating system 132.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device, comprising:
   a data storage unit, comprising:
      a first system storage area, storing an original operating system, and comprising a first initial sector address; and
      a second system storage area, storing a first backup operating system, and comprising a second initial sector address; and
   a controller, connected to the data storage unit, and comprising a firmware, wherein a boot pointer offset procedure is defined in the firmware, a boot pointer is preset by the firmware to point to the first initial sector address of the first system storage area, and a boot operation is executed by the original operating system; when the original operating system damages, the firmware of the controller executes the boot pointer offset procedure to offset the boot pointer to the second initial sector address of the second system storage area, and executes the boot operation by the first backup operating system of the second system storage area;
   wherein the data storage unit further comprises a third system storage area storing a second backup operating system, and an operating system recovery procedure is defined in the firmware; when the first backup operating system finishes the boot operation and operates normally, the firmware of the controller executes the operating system recovery procedure to recover the original operating system of the first system storage area by the second backup operating system of the third system storage area.

2. The data storage device according to claim 1, wherein the data storage device further comprises a data transmission interface connected to the controller;

when the controller receives an external triggering command via the data transmission interface, the firmware of the controller executes the boot pointer offset procedure according to the external triggering command.

3. The data storage device according to claim 1, wherein the controller is connected to an input and output port, the firmware of the controller executes the boot pointer offset procedure when the input and output port is triggered.

4. The data storage device according to claim 1, wherein a data sector of the first initial sector address and a data sector of the second initial sector address have a master boot record, respectively.

5. A method for maintaining normal boot operation of data storage device, wherein the data storage device comprises a data storage unit and a controller, the data storage unit comprises a first system storage area and a second system storage area, the first system storage area stores an original operating system and comprises a first initial sector address, the second system storage area stores a first backup operating system and comprises a second initial sector address, the controller comprises a firmware, a boot pointer offset procedure is defined in the firmware, the method executed by the firmware of the controller comprising steps of:

presetting a boot pointer to point to the first initial sector address of the first system storage area;

executing the boot pointer offset procedure to offset the boot pointer to the second initial sector address of the second system storage area when the original operating system damages;

reading a master boot record from the second initial sector address of the second system storage area; and executing a boot operation of the first backup operating system according to the master boot record read from the second initial sector address of the second system storage area;

wherein the data storage unit further comprises a third system storage area storing a second backup operating system, an operating system recovery procedure is defined in the firmware; when the first backup operating system finishes the boot operation and operates normally, the method executed by the firmware of the controller further comprising steps of:

executes the operating system recovery procedure; and recovering the original operating system of the first system storage area by the second backup operating system of the third system storage area.

6. The method according to claim 5, further comprising:

controlling the firmware of the controller to execute the boot pointer offset procedure by a means of software triggering or a hardware triggering.

* * * * *